(12) United States Patent
Leeman et al.

(10) Patent No.: US 12,736,766 B2
(45) Date of Patent: Sep. 15, 2026

(54) SPLICE CLOSURE WITH HIGH-DENSITY SPLICE CASSETTES

(71) Applicant: Sterlite Technologies Limited, Gurgaon (IN)

(72) Inventors: Sam Leeman, Kessel-Lo (BE); Matteo Villani, Abbiategrasso (IT)

(*) Notice: Subject to any disclaimer, the term of this patent is extended or adjusted under 35 U.S.C. 154(b) by 0 days.

(21) Appl. No.: 17/485,462

(22) Filed: Sep. 26, 2021

(65) Prior Publication Data

US 2022/0317403 A1 Oct. 6, 2022

(51) Int. Cl.
*G02B 6/44* (2006.01)
*G02B 6/255* (2006.01)

(52) U.S. Cl.
CPC .......... *G02B 6/4454* (2013.01); *G02B 6/2558* (2013.01)

(58) Field of Classification Search
None
See application file for complete search history.

(56) References Cited

U.S. PATENT DOCUMENTS 5,080,459 A * 1/1992 Wettengel ............ G02B 6/4452 385/95
5,323,478 A * 6/1994 Milanowski ......... G02B 6/4454 385/135
5,450,518 A * 9/1995 Burek .................. G02B 6/4454 385/135
5,689,605 A * 11/1997 Cobb ................... G02B 6/4454 385/135
5,956,449 A * 9/1999 Otani ................... G02B 6/4454 385/134
6,192,180 B1 * 2/2001 Kim ..................... G02B 6/4455 385/135
6,353,697 B1 * 3/2002 Daoud ................. G02B 6/4454 385/136
7,113,687 B2 * 9/2006 Womack .............. G02B 6/4452 385/134
7,200,314 B2 * 4/2007 Womack .............. G02B 6/4452 385/135
7,418,184 B1 * 8/2008 Gonzales ............. G02B 6/4455 385/134
8,494,332 B2 * 7/2013 Rudenick ............... G02B 6/445 312/223.1

(Continued)

FOREIGN PATENT DOCUMENTS

CA 2504678 C * 10/2009 ........... G02B 6/4452
CA 2719214 A1 * 10/2009 ........... G02B 6/4452

(Continued)

OTHER PUBLICATIONS

Kitizawa et al., Machine Translation of JP 11-167029-A, Jun. 22, 1999. (Year: 1999).*

(Continued)

*Primary Examiner* — Michelle R Connelly
(74) *Attorney, Agent, or Firm* — Steven R. Fairchild

(57) ABSTRACT

The present invention discloses a splice closure includes one or more splicing cassettes, and each of the one or more splicing cassettes has foldable sub-cassettes. In particular, each of the plurality of foldable sub-cassettes further has one or more splice protectors. Moreover, the one or more splicing cassettes are arranged in anyone configuration selected from an open configuration and a closed configuration.

14 Claims, 11 Drawing Sheets

(56) References Cited

U.S. PATENT DOCUMENTS

| | | | | |
|---|---|---|---|---|
| 2007/0104447 A1* | 5/2007 | Allen | .................. | G02B 6/4454 385/135 |
| 2008/0310811 A1* | 12/2008 | Gonzales | ............. | G02B 6/4455 385/135 |

FOREIGN PATENT DOCUMENTS

| | | | | | | |
|---|---|---|---|---|---|---|
| CN | 1110714 | C | * | 6/2003 | ........... | G02B 6/4455 |
| EP | 1026530 | A1 | * | 8/2000 | ........... | G02B 6/4455 |
| EP | 2490059 | A1 | * | 8/2012 | ........... | G02B 6/4454 |
| JP | 11-167029 | A | * | 6/1999 | ........... | G02B 6/4453 |

OTHER PUBLICATIONS

Cowley et al., Machine Translation of CA-2504678-C, Oct. 6, 2006. (Year: 2006).*

* cited by examiner

300

700

SPLICE CLOSURE WITH HIGH-DENSITY SPLICE CASSETTES

CROSS-REFERENCE TO RELATED APPLICATIONS

This application claims the benefit of Indian Application No. 202111014652 titled "Splice Closure With High-density Splice Cassettes" filed by the applicant on 31 Mar. 2021, which is incorporated herein by reference in its entirety.

FIELD OF THE INVENTION

Embodiments of the present invention relate to the field optical communications. And more particularly, relates to splice closure with high-density splice cassettes.

DESCRIPTION OF THE RELATED ART

Optical communication networks play a vital role in today's networking infrastructure and long-haul communication. The optical communication networks are designed to meet the demands, such as high bandwidth, of end-users that lead to data, video, audio, or the like transmissions. Endeavors to meet the demands and to provide high bandwidth have been made using various techniques such as digital subscriber line, asynchronous digital subscriber line, integrated services digital network or the like. However, these conventional techniques fail to provide adequate bandwidth as well as are not economical for all the end-users.

With the advent of technology and to meet the demands, various optical fiber distribution systems and equipment have been introduced. Typically, the optical fiber distribution systems include fiber management trays mounted in telecommunications enclosures or splice closures or at other suitable locations. In general, the fiber management trays are used in managing and storing optical fibers and optical splices. Further, the fiber management trays comprise fiber routing paths that allow storage of excess length of the optical fibers without degrading optical properties of the optical fibers.

Generally, operators splice optical fibers in different fiber management trays. Firstly, single circuit (SC) trays are used to connect individual customers by splicing typically two fibers in one single thin tray. When cable elements such as the optical fibers are spliced to cable elements, mostly 12 optical fibers of that cable element are spliced in one single thicker tray. These trays are called single elements (SE) trays or cassettes.

The conventional fiber management trays come with limited splicing capacity. Further, for example, with intermittently bonded optical fiber ribbons, although the splicing capacity may be increased in the single thicker tray, however, this leads to inability to differentiate between two fiber elements, such as the optical fibers, spliced in the single thicker tray. In cases, if two intermittently bonded optical fiber ribbons are spliced in the single thicker tray, then colour of the optical fibers will appear twice in the single thicker tray leading to confusion and faulty fiber links.

Thus, improvements in the fiber management trays are desired for increasing the splicing capacity.

Hence, the present invention focuses to ameliorate the aforementioned problems by providing a high-density splice closure.

SUMMARY OF THE INVENTION

An embodiment of the present invention relates to a splice closure with high density splice cassettes. In particular, the splice closure comprises one or more splicing cassettes. Moreover, each of the one or more splicing cassettes has a plurality of foldable sub-cassettes. Further, each of the plurality of foldable sub-cassettes has one or more splice protectors.

In accordance with an embodiment of the present invention, the one or more splicing cassettes are arranged in anyone configuration selected from an open configuration and a closed configuration.

In accordance with an embodiment of the present invention, in the open configuration of the one or more splicing cassettes, each of the plurality of foldable sub-cassettes is hinged to adjacent foldable sub-cassettes. In particular, the sub-cassettes are hinged such that each of the plurality of foldable sub-cassettes of the one or more splicing cassettes is arranged horizontally. Moreover, the horizontally arranged one or more splicing cassette enables splicing of one intermittently bonded ribbon (IBR) or a ribbon.

In accordance with an embodiment of the present invention, the intermittently bonded ribbon (IBR) has 12 optical transmission elements on each of the plurality of foldable sub-cassettes.

In accordance with an embodiment of the present invention, each of the 12 optical transmission elements has a different colour.

In accordance with an embodiment of the present invention, in the closed configuration of the one or more splicing cassettes, the plurality of foldable sub-cassettes is folded on to a base cassette to form the one or more splicing cassettes. In particular, the one or more splicing cassettes are stacked parallel to each other in the splice closure. Moreover, the one or more splice protectors on the plurality of foldable sub-cassettes of a splicing cassette are arranged in such a manner that each of the one or more splice protectors is unaligned to the adjacent foldable sub-cassettes of the splicing cassette.

In accordance with an embodiment of the present invention, each of the plurality of foldable sub-cassettes has one or more cavities to accommodate the one or more splice protectors of the adjacent foldable sub-cassettes in the one or more splicing cassette.

In accordance with an embodiment of the present invention, the splice protectors are defined by a splice protector thickness and each of the plurality of foldable sub-cassettes is defined by a sub-cassette thickness.

In accordance with an embodiment of the present invention, the splice protector thickness is greater than the sub-cassette thickness.

In accordance with an embodiment of the present invention, each of the plurality of foldable sub-cassettes is used to splice the intermittently bonded ribbon. In particular, each optical transmission element of the intermittently bonded ribbon is differently coloured.

In accordance with an embodiment of the present invention, one or more splice protectors are a ribbon protector.

In accordance with an embodiment of the present invention, the number of the one or more splice protectors is 12.

Another embodiment of the present invention relates to a method for creating a splice closure with high density splice cassettes comprises creating one or more splicing cassettes, and each of the one or more splicing cassettes has a plurality of foldable sub-cassettes, and each of the plurality of foldable sub-cassettes has one or more splice protectors.

In accordance with an embodiment of the present invention, the method includes arranging the one or more splicing cassettes in anyone configuration selected from an open configuration and a closed configuration.

In accordance with an embodiment of the present invention, in the open configuration of the one or more splicing cassettes, the each of the plurality of foldable sub-cassettes is hinged to adjacent foldable sub-cassette and arranged horizontally for splicing of one intermittently bonded ribbon (IBR) or a ribbon.

In accordance with an embodiment of the present invention, in the closed configuration of the one or more splicing cassettes, the plurality of foldable sub-cassettes is folded on to a base cassette forming the one or more splicing cassettes.

In accordance with one aspect of the present invention, the high-density splice closure has double density single element splicing cassettes with improved splicing capacity.

In accordance with another aspect of the present invention, the double density single element splicing cassettes provides optical transmission elements such as optical fibers and optical fiber ribbons.

These and other aspects herein will be better appreciated and understood when considered in conjunction with the following description and the accompanying drawings. It should be understood, however, that the following descriptions are given by way of illustration and not of limitation. Many changes and modifications may be made within the scope of the invention herein without departing from the spirit thereof.

The foregoing objectives of the present invention are attained by employing a splice closure with high density splice cassettes and a method for creating the splice closure.

BRIEF DESCRIPTION OF THE DRAWINGS

So that the manner in which the above recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

ELEMENT LIST

Figure 1:
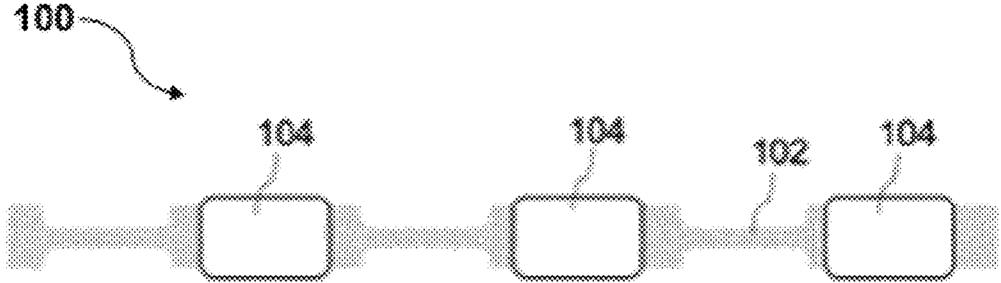
FIG. 1 is a pictorial representation illustrating a side cross-section of one or more splicing cassettes (trays) without a plurality of foldable sub-cassettes in accordance with an embodiment of the present invention.

Splicing Cassettes 102
Splice Protectors 104
Cavities 106
Splicing Cassettes Stack 200
Supporting Structure 202
Attachment Means 204
Base Cassette 502
Foldable Sub-cassettes 502*a*, 502*b*
Connecting Means 504
Outer Tube 902
Strength Member 904
Inner Tube 906

The method and apparatus are illustrated in the accompanying drawings, throughout which like reference letters indicate corresponding parts in the various figures.

It should be noted that the accompanying figure is intended to present illustrations of exemplary embodiments of the present disclosure. This figure is not intended to limit the scope of the present disclosure. It should also be noted that the accompanying figure is not necessarily drawn to scale.

DETAILED DESCRIPTION OF THE INVENTION

The present invention relates to a splice closure with high density splice cassettes and a method for creating the splice closure.

The principles of the present invention and their advantages are best understood by referring to FIG. 1 to FIGS. 12. In the following detailed description of numerous specific details are set forth in order to provide a thorough understanding of the embodiment of invention as illustrative or exemplary embodiments of the disclosure, specific embodiments in which the disclosure may be practiced are described in sufficient detail to enable those skilled in the art to practice the disclosed embodiments. However, it will be obvious to a person skilled in the art that the embodiments of the invention may be practiced with or without these specific details. In other instances, well known methods, procedures and components have not been described in details so as not to unnecessarily obscure aspects of the embodiments of the invention.

The following detailed description is, therefore, not to be taken in a limiting sense, and the scope of the present disclosure is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present disclosure.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The following brief definition of terms shall apply throughout the present invention:

An optical fiber refers to a medium associated with transmission of information over long distances in form of light pulses. The optical fiber uses light to transmit voice and data over long distances. Further, the intermittently bonded optical fiber ribbon comprises a plurality of optical fibers placed in parallel to each other and bonded intermittently with a special material such as matrix material to impart rolling capability along a width of the intermittently bonded optical fiber ribbon.

FIG. 1, FIG. 2, FIG. 3 and FIG. 4 are pictorial representation illustrating a side cross-section 100 of one or more splicing cassettes 102 without a plurality of foldable sub-cassettes, a side cross-section of the one or more splicing cassettes stack 200 without the plurality of foldable sub-cassettes, where the one or more splicing cassettes stacked on top of each other, a perspective view 300 of the one or more splicing cassettes stack 200 without the plurality of foldable sub-cassettes, a perspective view 400 of the one or more splicing cassettes, without the plurality of foldable sub-cassettes, having one or more splice protectors 104 respectively in accordance with one or more embodiments of the present invention. In particular, a splice closure comprises one or more splicing cassettes. Each of the one or more splicing cassettes has a plurality of foldable sub-cassettes and each of the plurality of foldable sub-cassettes has one or more splice protectors.

In an open configuration of the one or more splicing cassettes, each of the plurality of foldable sub-cassettes is hinged to adjacent foldable sub-cassettes such that each of the plurality of foldable sub-cassettes of the one or more splicing cassettes is arranged horizontally to enable splicing of one intermittently bonded ribbon (IBR) or a ribbon with 12 optical transmission elements on each of the plurality of foldable sub-cassettes. Each of the 12 optical transmission elements has a different colour.

In a closed configuration of the one or more splicing cassettes, the plurality of foldable sub-cassettes is folded on to a base cassette to form the one or more splicing cassettes, and the one or more splicing cassettes are stacked parallel to each other in the splice closure. The one or more splice protectors on the plurality of foldable sub-cassettes of a splicing cassette are arranged in such a manner that each of the one or more splice protectors is unaligned to the adjacent foldable sub-cassettes of the splicing cassette. Each of the plurality of foldable sub-cassettes has one or more cavities to accommodate the one or more splice protectors of the adjacent foldable sub-cassettes in the one or more splicing cassette.

The one or more splice protectors are defined by a splice protector thickness, and each of the plurality of foldable sub-cassettes is defined by a sub-cassette thickness. In particular, the splice protector thickness is greater than the sub-cassette thickness.

Each of the plurality of foldable sub-cassettes is used to splice the intermittently bonded ribbon, and each optical transmission element of the intermittently bonded ribbon is differently coloured. The one or more splice protectors are a ribbon protector and the number of the one or more splice protectors is 12.

Figure 2:
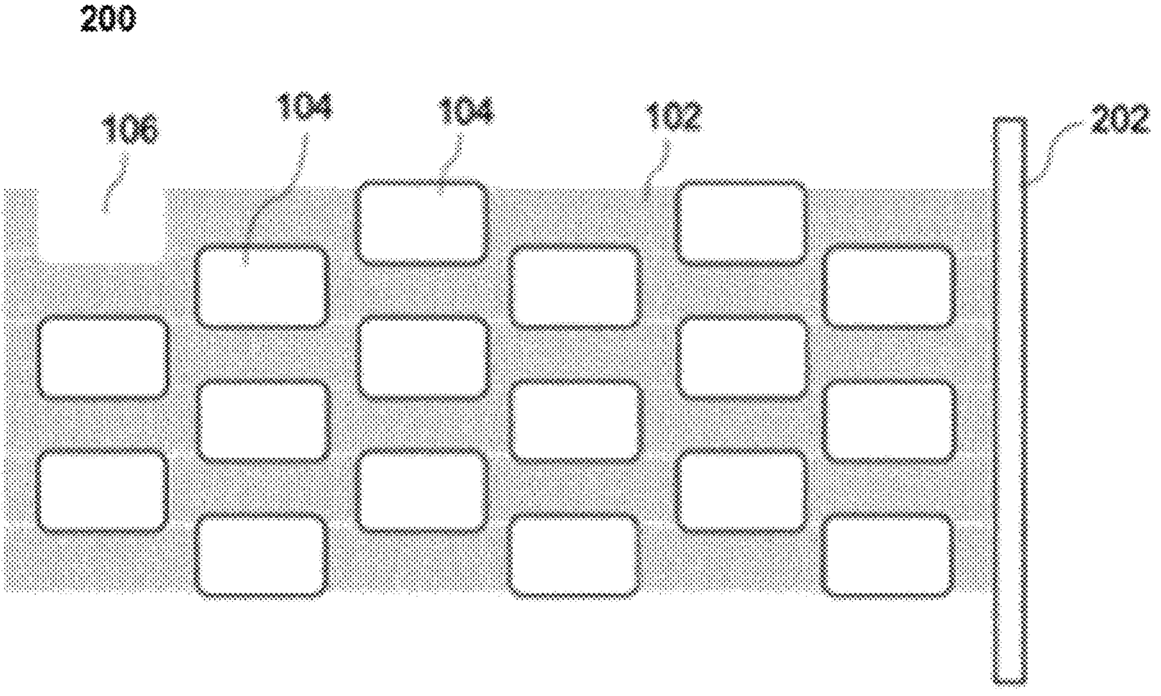
FIG. 2 is a pictorial representation illustrating a side cross-section of the one or more splicing cassettes, without the plurality of foldable sub-cassettes, stacked on top of each other in accordance with an embodiment of the present invention.

Referring to FIG. 2, one or more splicing cassettes stack 200 may be formed by the one or more splicing cassettes 102 arranged in a stacked manner. Particularly, one or more splicing cassettes (trays) may be used or incorporated in a splice closure or enclosure. The one or more splicing cassettes 102 may include one or more cavities 106 to accommodate the one or more splice protectors 104. Each of the one or more splice protectors 104 may protect spliced plurality of optical transmission elements such as optical fibers, intermittently bonded optical fiber ribbons etc.

In an example, each of the one or more splice protectors 104 may protect spliced 12 fiber intermittently bonded optical fiber ribbon.

Alternatively in other embodiments of the present invention, the one or more cavities 106 may accommodate any other suitable components used in conjunction with the splice closure.

Figure 3:
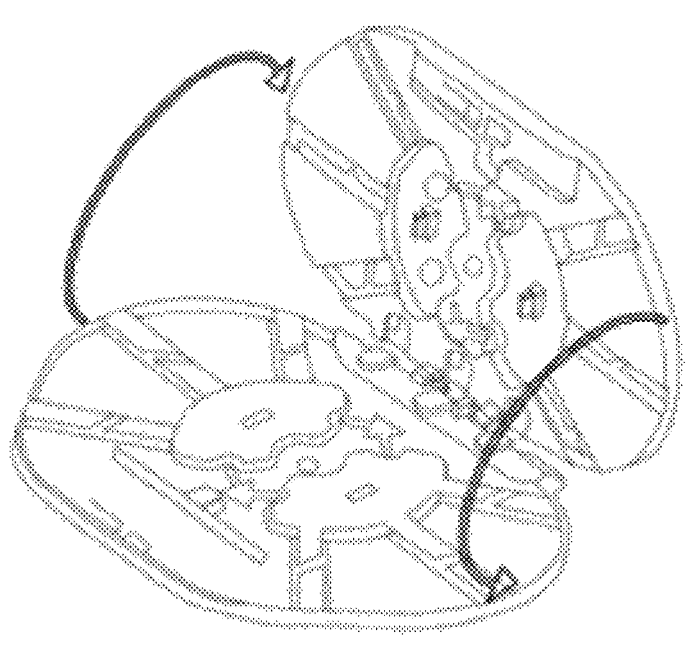
FIG. 3 is a pictorial representation illustrating a perspective view of the one or more splicing cassettes stack without the plurality of foldable sub-cassettes in accordance with an embodiment of the present invention.

Referring to FIG. 3 the one or more splicing cassettes 102 may be connected with each other removably and rotatably via hinged structures or any other suitable means. Particularly, one or more splicing cassettes 102 may be rotatably hinged to each other along an axis at the same backplane.

Figure 4:
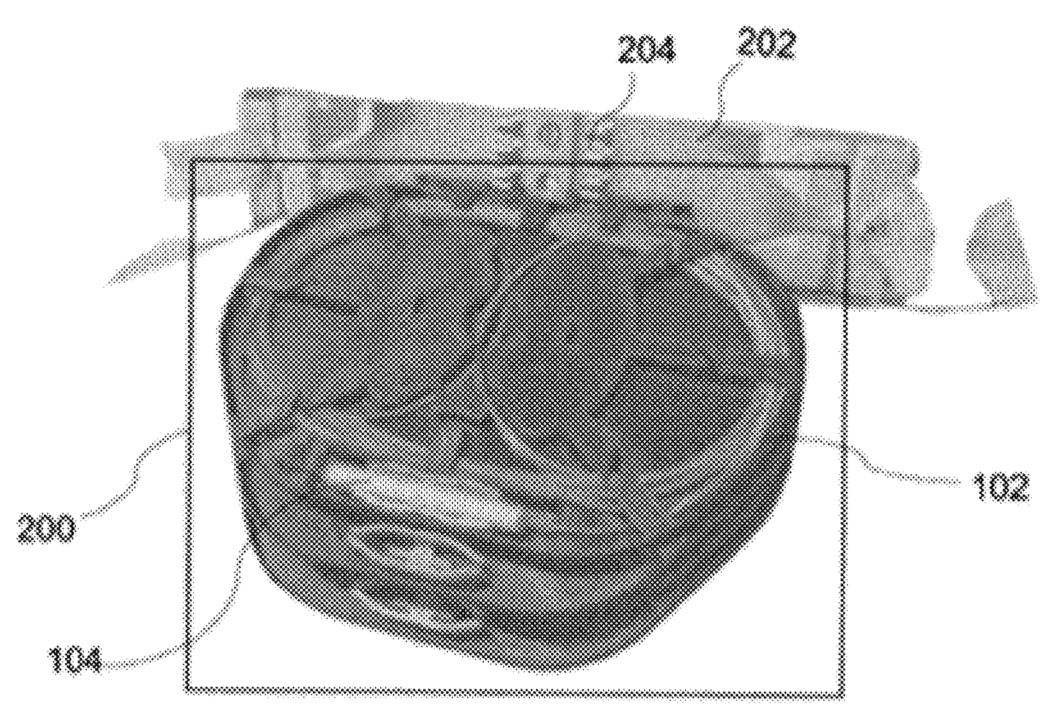
FIG. 4 is a pictorial representation illustrating a perspective view of the one or more splicing cassettes without the plurality of foldable sub-cassettes having one or more splice protectors in accordance with an embodiment of the present invention.

In accordance with an embodiment of the present invention, one or more splicing cassettes stack 200 may be removably hinged to a supporting structure 202 along an axis through an attachment means 204 (as shown in FIG. 4) from one side. Particularly, the attachment means 204 may be any type of fasteners, screws or elements having snap-fit capabilities.

In accordance with an embodiment of the present invention, the one or more splicing cassettes stack 200, and one or more splice protectors 104 may be protruded on adjacent cassettes/trays and may be placed in such a manner that the one or more splice protectors are unaligned i.e., not under each other.

In accordance with an embodiment of the present invention, each splicing cassette of the one or more splicing cassettes 102 may be defined by a thickness and each splice protector of the one or more splice protectors 104 may be defined by a splice protector diameter and a splice protector thickness. In particular, each of the one or more splicing cassettes 102 may have the thickness less than the splice protector diameter. This dimensional aspect allows the protrusion of each of the one or more splice protectors 104 on the adjacent cassettes/trays in the one or more splicing cassettes stack 200.

In an exemplary example, each of the one or more splice protectors 104 may have the splice protector diameter of 5.8 mm.

Alternatively in other exemplary examples and embodiments, the splice protector diameter of each of the one or more splice protectors 104 may vary.

For instance, each of the one or more splicing cassettes 102 has three splice protectors that can accommodate three intermittently bonded optical fiber ribbons in each of the three splice protectors.

Alternatively, the number of splice protectors may be more than or less than three in each of the one or more splicing cassettes 102.

In accordance with an embodiment of the present invention, each intermittently bonded optical fiber ribbon may accommodate 12 optical fibers of different colour. Alternatively, the number and colour of the optical fibers in the intermittently bonded optical fiber ribbon may vary.

In an example, each of the one or more splicing cassettes 102 may have three optical fibers of the same colour.

In accordance with another aspect of the present invention, each of the one or more splicing cassettes 102 may have the one or more cavities to accommodate protruded splice protectors (or any other component) on the adjacent cassettes that leads to high density packing of the plurality of optical transmission elements.

FIG. 5, FIG. 6, FIG. 7 and FIG. 8 are pictorial representation illustrating a side cross-section of one or more splicing cassettes/trays 500 with a base cassette 502 and the plurality of foldable sub-cassettes (trays) 502*a*, 502*b* in a closed configuration, a side cross-section of the one or more splicing cassettes/trays 500 in a semi-open configuration, a side cross-section of the one or more splicing cassettes/trays 500 in an open configuration and a side cross-section of the one or more splicing cassettes stack 600 comprising the one or more splicing cassettes 500 having the base cassette 502 and the plurality of foldable sub-cassettes 502*a*, 502*b* stacked in parallel respectively in accordance with one or more embodiments of the present invention. In particular, the one or more splicing cassettes/trays 500 may be incorporated in the splice enclosure (or closure).

Figure 6:
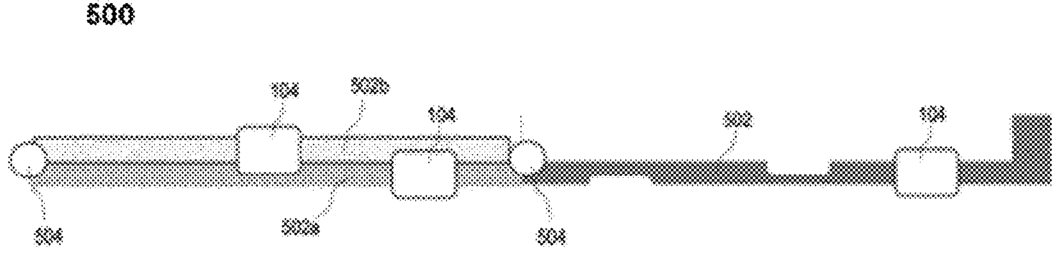
FIG. 6 is a pictorial representation illustrating a side cross-section of one or more splicing cassettes with the plurality of foldable sub-cassettes in accordance with another embodiment of the present invention.
Figure 7:
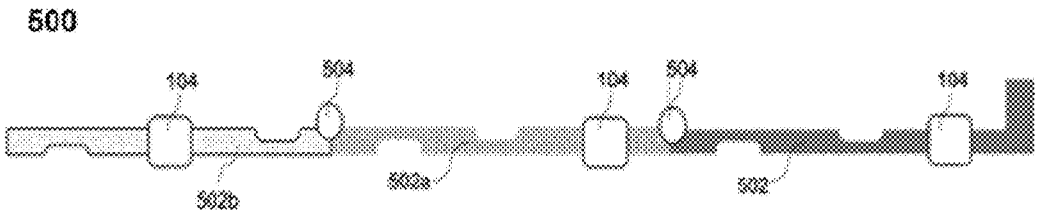
FIG. 7 is a pictorial representation illustrating a side cross-section of one or more splicing cassettes with the plurality of foldable sub-cassettes in accordance with yet another embodiment of the present invention.

In accordance with an aspect of the present invention, the one or more splicing cassettes 500 having the plurality of foldable sub-cassettes 502*a*, 502*b* are formed using a main cassette/tray 502 and the plurality of foldable sub-cassettes/sub-trays 502*a*, 502*b*, where the main cassette 502 acts as the base cassette/tray. Each of the plurality of foldable sub-cassettes 502*a*, 502*b* is connected with each other through a connecting means 504 that allows connection as well as movement of the plurality of foldable sub-cassettes 502*a*, 502*b* in operational condition (as illustrated in FIG. 6 and FIG. 7).

In particular, the plurality of foldable sub-cassettes 502*a*, 502*b* is foldable in accordance with an axis of the base cassette/tray 502. For illustration purposes, only two foldable sub-cassettes 502*a*, 502*b* have been shown, however, the number of the plurality of foldable sub-cassettes may be more than two 502*a*, 502*b*, 502*c* . . . 502*n*.

In accordance with an aspect of the present invention, each of the base cassette 502 and the plurality of foldable sub-cassettes 502*a*, 502*b* may include the one or more splice protectors 104. This arrangement forms the one or more splicing cassettes 500 with three splice protectors.

Figure 5:
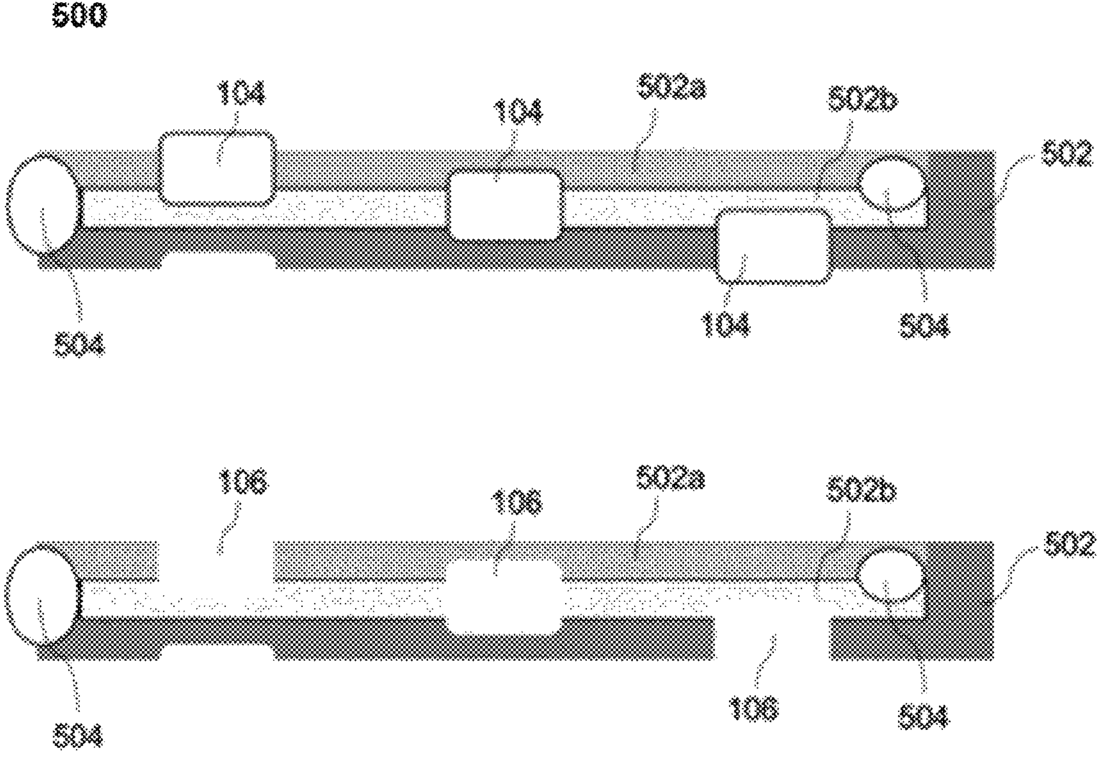
FIG. 5 is a pictorial representation illustrating a side cross-section of one or more splicing cassettes with the plurality of foldable sub-cassettes in accordance with one embodiment of the present invention.

In this configuration, the one or more splicing cassettes 500 having the base cassette 502 and the plurality of foldable sub-cassettes 502*a*, 502*b* may have the one or more cavities 106. In particular, each of the one or more splice protectors 104 may be protruded into adjacent sub-cassette and the base cassette and may be unaligned to each other. Moreover, one or more splicing cassettes 500 having the base cassette 502 and the plurality of foldable sub-cassettes 502*a*, 502*b* may have the one or more cavities 106 to accommodate the one or more splice protectors 104 in the adjacent cassettes (as illustrated in FIGS. 5-7).

In an implementation of the present invention, the base cassette 502 may be a thicker cassette. And, the plurality of foldable sub-cassettes 502*a*, 502*b* may be thinner sub-cassettes as compared to the base cassette 502. In addition, each of the plurality of foldable sub-cassettes may be defined by a sub-cassette thickness, where the splice protector thickness is greater than the sub-cassette thickness. Particularly, the base cassette 502 has plurality of foldable sub-cassettes 502*a*, 502*b*, that are hinged and foldable, creates two separate zones (i.e., the base cassette and the plurality of foldable sub-cassettes arranged horizontally).

In accordance with an aspect of the present invention, the plurality of optical transmission elements may be spliced in each of the base cassette 502 and the plurality of foldable sub-cassettes 502*a*, 502*b*, i.e., in the two separate zones. For example, one 12F intermittently bonded optical fiber ribbon or a ribbon with 12 optical transmission elements, and each of the 12 optical transmission elements may have different colour, may be spliced in each of the thick cassettes and thin sub-cassettes in two separate zones.

Figure 8:
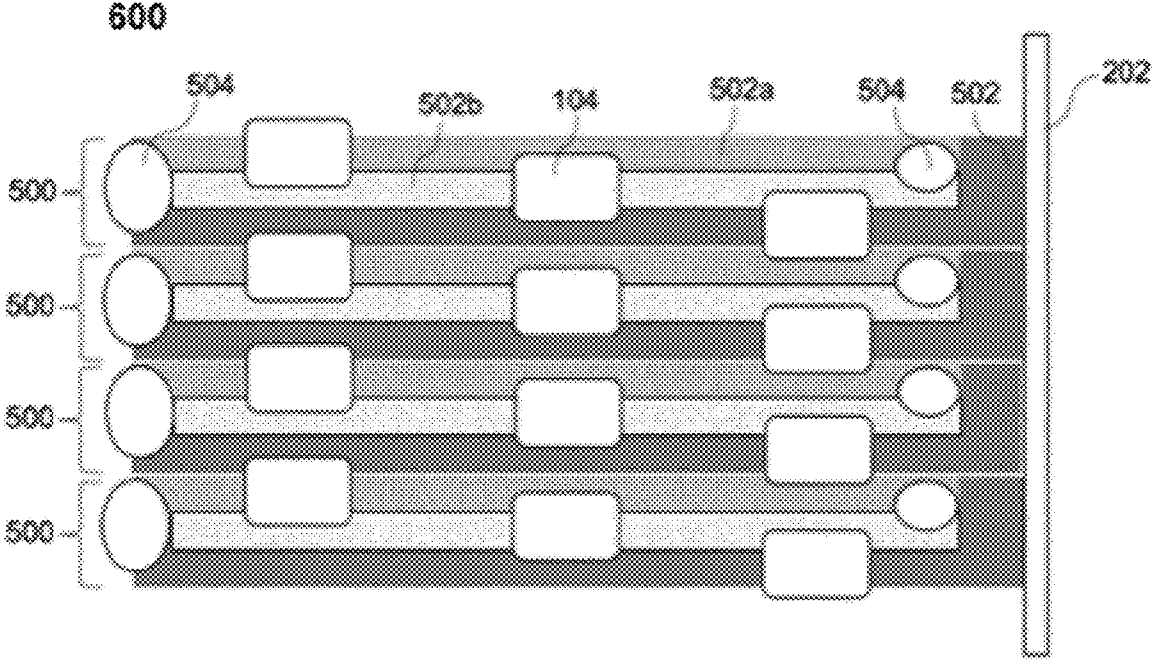
FIG. 8 is a pictorial representation illustrating a side cross-section of the one or more splicing cassettes, with the plurality of foldable sub-cassettes, stacked on top of each other.

In accordance with an aspect of the present invention, the one or more splicing cassettes stack 600 (as illustrated in FIG. 8) may be formed by the one or more splicing cassettes 500 arranged in a stacked manner. The one or more splicing cassettes stack 600 may be removably hinged to the supporting structure 202 along an axis through the attachment means from one side.

Figure 9:
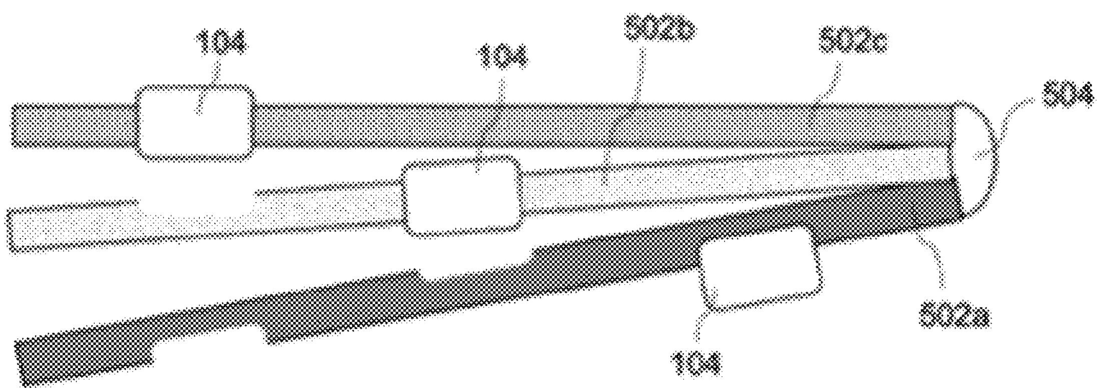
FIG. 9 is a pictorial representation illustrating a different exemplary foldable configuration utilized in the one or more splicing cassettes without the plurality of foldable sub cassettes in accordance with one embodiment of the present invention.
Figure 10:
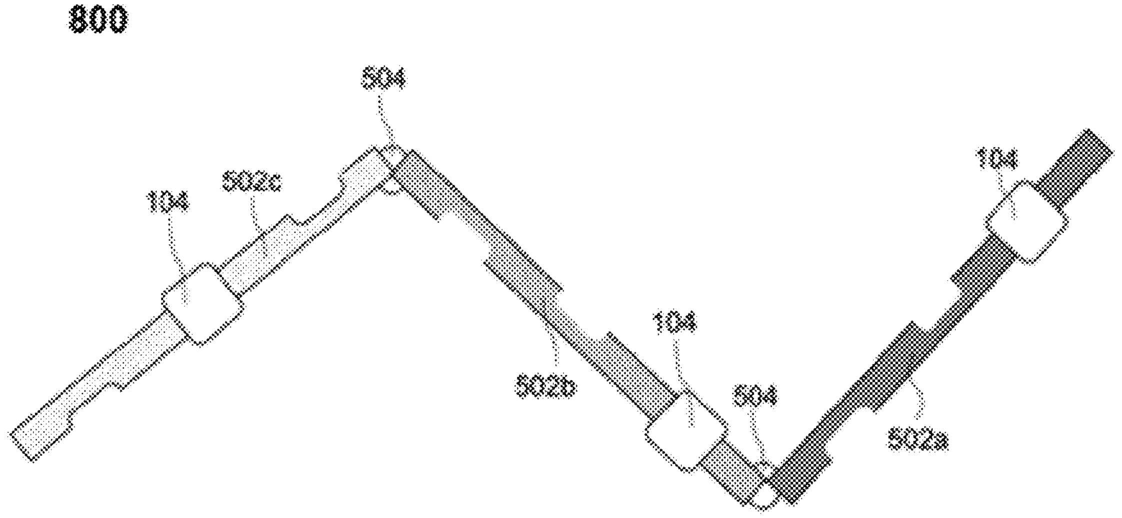
FIG. 10 is a pictorial representation illustrating a different exemplary foldable configuration utilized in the one or more splicing cassettes with the plurality of the foldable sub-cassettes in accordance with another embodiment of the present invention.

FIG. 9 and FIG. 10 are pictorial representations illustrating a different exemplary foldable configuration utilized in the one or more splicing cassettes without the plurality of foldable sub cassettes and with the plurality of the foldable sub-cassettes respectively in accordance with one or more embodiments of the present invention. In particular, the plurality of foldable sub-cassettes 502*a*, 502*b* may be folded endlessly from the base cassette 502 like an endless chain. Moreover, the plurality of foldable sub-cassettes 502*a*, 502*b*, 502*c* may hinge at one axis i.e., at the same backplane with the help of the hinge/connecting means 504.

For example, if the number of the plurality of foldable sub-cassettes is 3, then all 3 foldable sub-cassettes may hinge at the same backplane. Similarly, if the number of the plurality of foldable sub-cassettes is 4, then all 4 foldable sub-cassettes may hinge at the same backplane.

The one or more splicing cassette 500 may utilize a book-fold configuration 700 as shown in FIG. 9 and a Z-fold configuration 800 as shown in FIG. 10 to stack the plurality of foldable sub-cassettes 502*a*, 502*b*, 502*c* . . . 502*n* one to the other.

In alternative embodiments of the present invention, other suitable folding configurations may also be utilized.

In accordance with an aspect of the present invention, with intermittently bonded optical fiber ribbons, although the splicing capacity may be increased in conventional single thicker cassettes/trays, however, this leads to inability to clearly differentiate between two optical transmission elements, such as the optical fibers, spliced in the conventional single thicker cassette/tray. For example, if two intermittently bonded optical fiber ribbons are spliced in the conventional single thicker cassette, then colour of the optical fibers will appear twice in the conventional single thicker cassette leading to confusion and faulty fiber links. Thus, by splitting the conventional single thicker cassette into the plurality of foldable sub-cassettes 502*a*, 502*b*, the plurality of the optical transmission elements, such as two intermittently bonded optical fiber ribbons, may be spliced in the same thickness as the conventional single thicker cassette (or single element cassette) by keeping each of the plurality of the optical transmission elements to be separated.

Hence, the one or more splicing tray 500 consists of the plurality of foldable sub-cassettes 502*a*, 502*b*, . . . 502*n* that fold into each other and into the base cassette 502, doubles the amount of splicing in the same space whilst keeping the cassettes perfectly separated.

In accordance with an aspect of the present invention, the high-density splicing cassette (tray) is a double-density single element splicing cassette that helps increasing capacity of telecommunications enclosures such as splice enclosures/closures or terminals. In particular, the splice enclosures/closures may be mounted in indoor as well as in outdoor environments and are used to protect cable elements such as stripped fiber optic cable and fiber optic splices. Moreover, the splice enclosures may be mounted on poles or walls, in junction boxes, in below-grade vaults or the like. Further, the splice enclosures act as a housing, in which a plurality of optical transmission elements is fanned out that are situated at the end of fiber routing paths.

The splicing cassette(s), also termed as a splicing tray(s), mounted in the splice enclosures picks up the plurality of optical transmission elements and their reserves. The splicing cassette may be made from plastic and other suitable material. In particular, the splicing cassette is a removable element in order to assemble the plurality of optical transmission elements with a splice unit. The plurality of optical transmission elements may be, but not limited to, optical fibers and optical fiber ribbons such as intermittently bonded optical fiber ribbons or the like.

Figure 11:
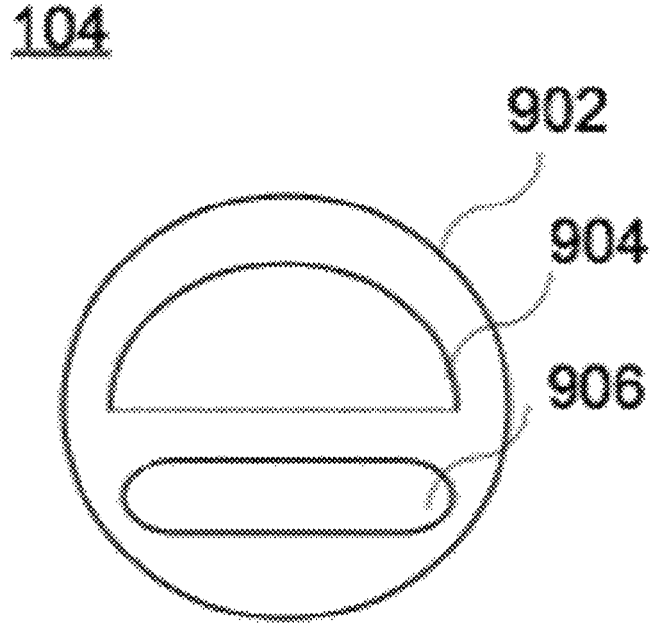
FIG. 11 is a pictorial representation illustrating a splice protector from the one or more splice protectors in accordance with an embodiment of the present invention.

FIG. 11 is a pictorial representation illustrating a splice protector from the one or more splice protectors in accordance with an embodiment of the present invention. Particularly, one or more splice protectors 104 includes an outer tube 902, a strength member 904 and an inner tube 906. In particular, the outer tube 902 is a shrink tube that encapsulates the strength member 904 and the inner tube 906. And, the outer tube 902 may be made from any suitable material, such as, but not limited to, polymers, having capability of shrinking. Moreover, the strength member 904 may be made from ceramic, stainless steel or other suitable material. Further, the inner tube 906 is a fiber tube, where the fiber tube encapsulates the plurality of optical transmission elements. Subsequently, the outer tube 902 and the strength member 904 protects the inner tube 906, thereby protecting the plurality of optical transmission elements to avoid losses in optical properties of the plurality of optical transmission elements.

In accordance with an aspect of the present invention, one or more splice protectors 104 may have the splice protector diameter of 5.8 millimeters. Particularly, one or more splice protectors 104 may be made flexible and formed in such a way that when inserted/placed in a cavity of the one or more cavities 106, one or more splice protectors 104 may deform and take the shape of the cavity. Moreover, one or more splice protectors 104 may be a ribbon protector. And, the number of the one or more splice protectors may be 12.

Figure 12:
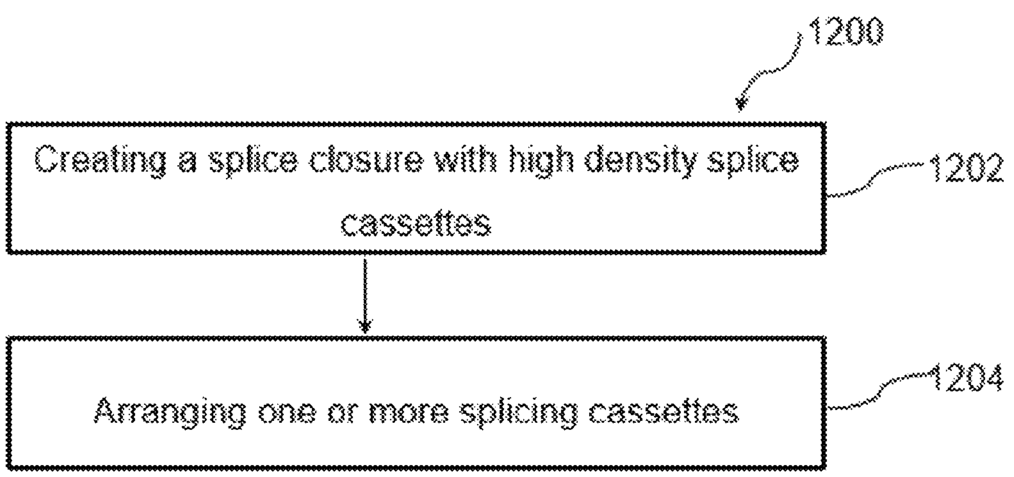
FIG. 12 is a flowchart illustrating a method for creating the splice closure with high density splice cassettes in accordance with an embodiment of the present invention.

FIG. 12 is a flowchart illustrating a method for creating the splice closure with high density splice cassettes in accordance with an embodiment of the present invention. The method starts at step 1202 and proceeds to step 1204. At step 1202, creating a splice closure with high density splice cassettes. The splice closure with high density splice cassettes comprises creating one or more splicing cassettes (500), and each of the one or more splicing cassettes (500) has a plurality of foldable sub-cassettes (502*a*, 502*b*), and each of the plurality of foldable sub-cassettes (502*a*, 502*b*) has one or more splice protectors (104).

At step 1204, arranging the one or more splicing cassettes (500) in anyone configuration selected from an open configuration and a closed configuration.

May be noted that the flowchart 1200 is explained to have above stated process steps, however, those skilled in the art would appreciate that the flowchart 1200 may have more/less number of process steps which may enable all the above stated embodiments of the present disclosure.

Advantageously, the above-mentioned arrangements double the amount of splicing in the same space whilst keeping the trays perfectly separated. Also, the present disclosure provides a unique design and arrangement of splicing cassettes in order to achieve a high-density splicing cassette.

The key idea of the present disclosure is to provide a unique design and arrangement of splicing cassettes in order to achieve a high-density splicing cassette.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the disclosure have been described above and illustrated in some cases, it should be interpreted and understood as to have been presented only by way of illustration and example, but not by limitation. Thus, the breadth and scope of a preferred embodiment should not be limited by any of the above-described exemplary embodiments.

It will be apparent to those skilled in the art that other embodiments of the invention will be apparent to those skilled in the art from consideration of the specification and practice of the invention. While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope of the invention. It is intended that the specification and examples be considered as exemplary, with the true scope of the invention being indicated by the claims.

What is claimed is:

1. A splice closure comprising: one or more splicing cassettes, wherein each of the one or more splicing cassettes has single element with a plurality of foldable sub-cassettes forming a stack configuration, and each of the plurality of foldable sub-cassettes further has one or more splice protectors and one or more cavities operably configured to accommodate the one or more splice protectors of an adjacent foldable sub-cassettes of the same stack configuration in the one or more splicing cassette: wherein the one or more splice protectors on the plurality of foldable sub-cassettes of a splicing cassette are arranged unaligned to an adjacent foldable sub-cassette of the splicing cassette: wherein the one or more splicing cassettes are arranged in any one configuration selected from an open configuration and a closed configuration and wherein in the open configuration each of the plurality of foldable sub-cassettes are arranged horizontally for splicing of one intermittently bonded ribbon (IBR) or a ribbon wherein in the closed configuration, the plurality of foldable sub-cassettes is folded on to a base cassette forming the one or more splicing cassettes, wherein the plurality of foldable sub-cassettes are thinner as compared to the base cassette.

2. The splice closure as claimed in claim 1, wherein in the open configuration of the one or more splicing cassettes, each of the plurality of foldable sub-cassettes is hinged to adjacent foldable sub-cassettes.

3. The splice closure as claimed in claim 1, wherein each of the plurality of foldable sub-cassettes have 12 optical transmission elements.

4. The splice closure as claimed in claim 3, wherein each of the 12 optical transmission elements has a different colour.

5. The splice closure as claimed in claim 1, wherein in the closed configuration the one or more splicing cassettes are arranged parallelly in the splice closure.

6. The splice closure as claimed in claim 1, wherein the one or more splice protectors are defined by a splice protector thickness and each of the plurality of foldable sub-cassettes is defined by a sub-cassette thickness.

7. The splice closure as claimed in claim 6, wherein the splice protector thickness is more than the sub-cassette thickness.

8. The splice closure as claimed in claim 6, wherein a number of the one or more splice protectors is 12.

9. The splice closure as claimed in claim 1, wherein the one or more splice protectors has a diameter of 5.8 mm.

10. The splice closure as claimed in claim 1, wherein each of the plurality of foldable sub-cassettes splices an intermittently bonded ribbon and each optical transmission element of the intermittently bonded ribbon has a different colour.

11. The splice closure as claimed in claim 1, wherein the one or more splice protectors is a ribbon protector.

12. A method for creating a splice closure with high density splice cassettes comprises creating one or more splicing cassettes, wherein each of the one or more splicing cassettes has single element with a plurality of foldable sub-cassettes, and each of the plurality of foldable sub-cassettes has one or more splice protectors and one or more cavities operably configured to accommodate the one or more splice protectors of an adjacent foldable sub-cassettes in the one or more splicing cassette; wherein the foldable sub-cassette are arranged horizontally for splicing of one intermittently bonded ribbon (IBR) or a ribbon wherein in a closed configuration, the plurality of foldable sub-cassettes is folded on to a base cassette forming the one or more splicing cassettes, wherein the plurality of foldable sub-cassettes are thinner sub-cassettes as compared to the base cassette.

13. The method as claimed in claim 12, wherein the method comprises arranging the one or more splicing cassettes in any one configuration selected from an open configuration and a closed configuration.

14. The method as claimed in claim 13, wherein in the open configuration of the one or more splicing cassettes, each of the plurality of foldable sub-cassettes is hinged to adjacent foldable sub-cassette and arranged horizontally for splicing of one intermittently bonded ribbon (IBR) or a ribbon.

* * * * *